Dec. 27, 1966 F. J. COSENZA 3,294,140
PANEL FASTENER
Filed Sept. 2, 1964 2 Sheets-Sheet 1
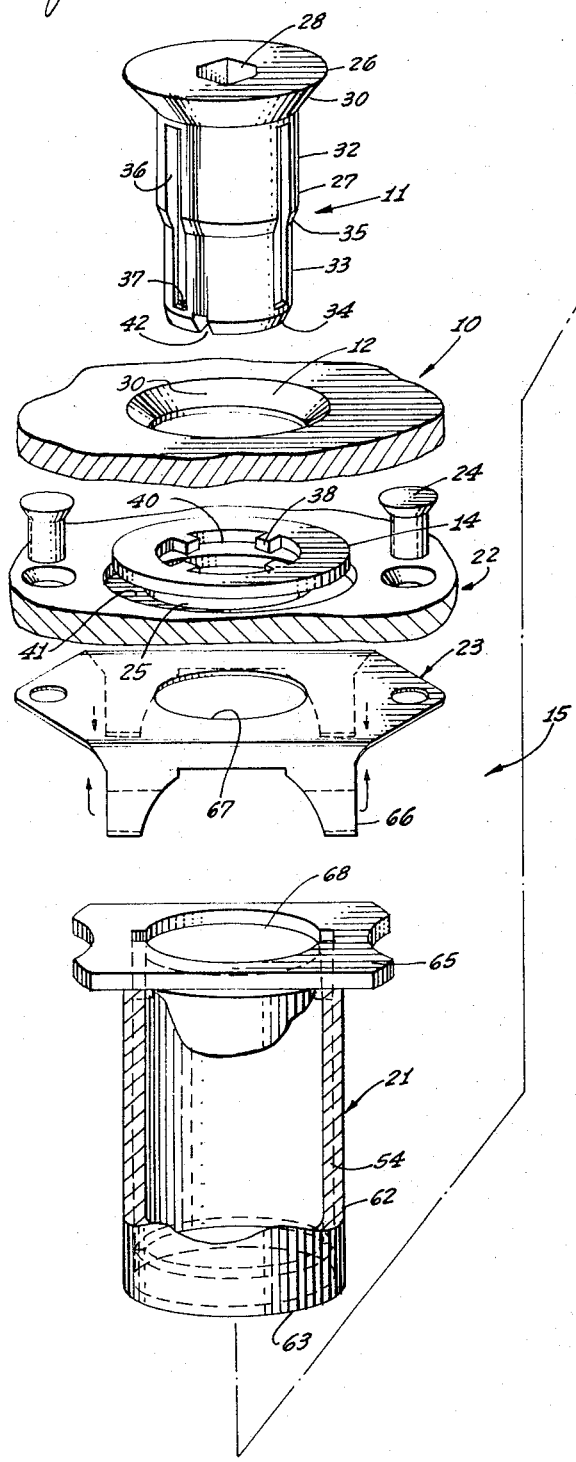
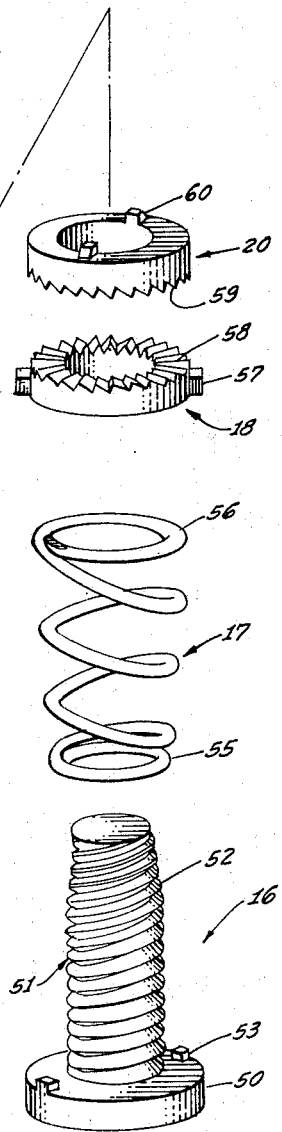
INVENTOR:
Frank J. Cosenza
Attorneys

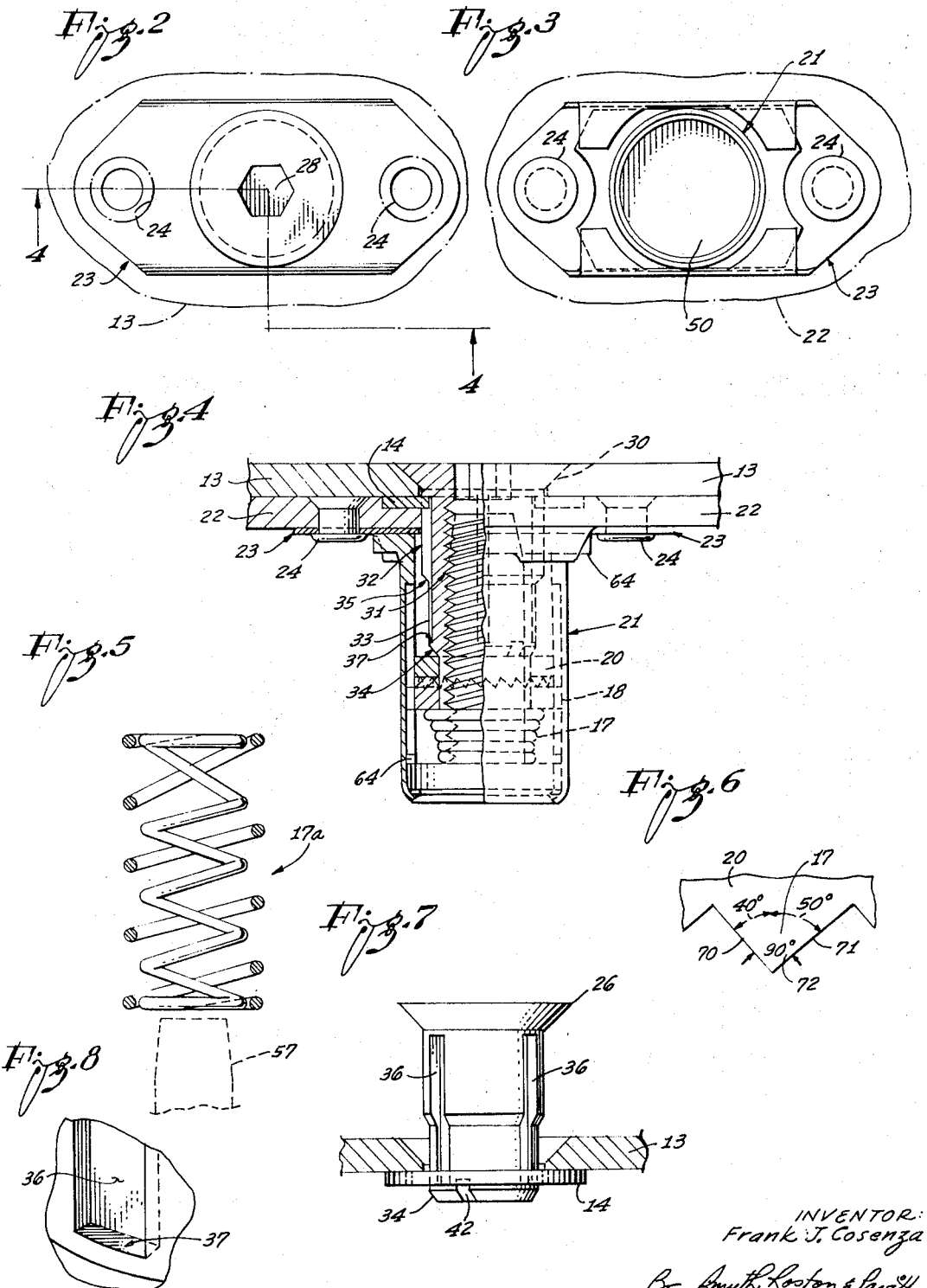

United States Patent Office 3,294,140
Patented Dec. 27, 1966

3,294,140
PANEL FASTENER
Frank J. Cosenza, Palos Verdes Peninsula, Calif., assignor to Calfax, Incorporated, Redondo Beach, Calif., a corporation of California
Filed Sept. 2, 1964, Ser. No. 393,963
4 Claims. (Cl. 151—13)

This invention relates to quick action fasteners, and more particularly to fasteners known in the industry as panel fasteners used to secure panel members, sometimes called access panels, to structural frame members or other panels, sometimes called the understructure, in aircraft and missiles.

These access panels are located in various places in an aircraft or missile and are removable to provide access to electronic, hydraulic or other equipment housed therein. Inasmuch as any access panel would ordinarily carry a multiplicity of fasteners, one of the requirements for such fasteners is that they must be capable of quick action permitting ready removal and ready replacing of the access panel to the understructure within the shortest possible time.

In addition to the requirement that such fasteners be quick acting, there are two other basic requirements which such fasteners have to meet. These requirements are ability to withstand vibration and high temperature to which said fasteners are subjected, and these requirements are becoming more rigid because of the increase in speeds and altitudes of the missiles and aircraft in which said fasteners are incorporated.

Panel fasteners must also be capable of not only withstanding stresses imposed upon the access panels due to designs which require that such access panels carry part of the load to be borne by the panels and the understructure, but such fasteners also must be capable of aligning the openings in the access panel with the openings in the understructure when such openings become misaligned during removal of the access panels or because of possible warping due to release in stress.

In addition, inasmuch as part of the fasteners should remain in place on the removed access panel for easy replacing of the panel, experience has shown that workmen have a tendency to use this part of the fastener as a handle in carrying the panels about. Thus, the fasteners, to meet the conditions required of them in the industry, must have a part thereof locked on the panel with such permanency that they will not become dislodged when subjected to the additional strains imposed thereon by carrying the panel about. It is also desirable that the part of the fastener which is used as a handle be substantially fully retractable so that a large portion thereof may be grasped by the workmen as they use this part, and, at the same time, this full retraction prevents damage to the fastener if the access panel is laid flat on a surface and moved by sliding about as is often the case.

The present invention meets all the aforesaid requirements and overcomes the problems therein involved, as will be clear from the more detailed description hereinafter.

The panel fastener comprising the present invention includes a stud nut assembly, adapted to be connected to the access panel, and a receptacle assembly, adapted to be connected to the understructure and so constructed that, when the stud nut assembly is received by the receptacle assembly, the access panel is fastened to the understructure. The stud nut assembly comprises a fastening sleeve having a head with an internally threaded body or shank for positioning through an opening in the access panel, and a rigid retaining ring for permanently mounting the fastening sleeve to the access panel. The receptacle assembly comprises a screw mounted in a barrel or receptacle and aligned with an opening in the understructure to which it is attached to receive the internal threads of the fastening sleeve passing through mating openings in the access panel and the understructure. By rotatably threading the fastening sleeve onto the screw, the end of the fastening sleeve is brought into contacting relationship with a spring biased ratcheting device in the receptacle assembly, which device comprises a pair of relatively movable rings having interengaging teeth thereon. A locking arrangement is provided to lock the fastening sleeve onto one of the rings to the fastening sleeve as it is torqued into the receptacle assembly while the other ring is held non-rotatably, but axially movable, within the receptacle assembly. Continued torquing overcomes the spring bias, and the interengaging teeth serve to draw the access panel to the understructure and fasten the same in place.

In addition to having the rigid retaining ring mentioned above, the stud nut assembly is also provided with a means for aligning the holes in the access panel and the understructure which are, or might become, misaligned when the access panel is removed. This alignment means comprises a portion of a larger diameter on the stud nut shank near the head, and a portion of smaller diameter near the opposite end of the shank for insertion through the understructure hole separated by a tapered shoulder for engaging the holes in the access panel and in the understructure when the panel and the understructure are being drawn together by the fastener.

Another feature of the invention is that the interengaging teeth on the relatively movable rings of the ratcheting device in the receptacle assembly have a tooth profile such that a torque required to tighten or torque-in the stud nut is markedly lower than the torque required to unthread or torque-out the stud nut. In the embodiment disclosed, this is accomplished by providing the teeth of the ratcheting device with profiles, such as complementary surfaces, form inclined planes disposed at an angle with the plane of relative rotation of the rings which is less than the angle formed between the inclined planes and the plane of relative rotation of the rings formed by second surfaces on the teeth. This unsymmetrical tooth profile arrangement provides greater ease of insertion of the stud nut into the receptacle assembly for any given preload on the spring which biases the ratcheting device, and provides greater security to the fastener to remain fastened because of the increased torque required to unthread or torque-out the fastener. This latter is particularly important where the fasteners are subject to a vibrational load. This arrangement also has another advantage in that a lighter spring may be used for any given torque-out value which is important, particularly where small fasteners are selected or required. Additional advantages in this arrangement are that the reliability and life of the spring are increased because of the lower working stress on the spring, and inasmuch as high temperatures have less effect on springs of lower stress value, the temperature to which the fastener may be subjected is accordingly raised. A still further advantage of this arrangement occurs in the final stages of tightening the access panel to the understructure where more torque, of the total torque applied to the fastener, is available to apply to the compressive load between the access panel and the understructure as the latter are being drawn toward one another.

The above feature of the tooth profile in this invention has an additional advantage, as will be clear from the more detailed description hereinafter, in that the tooth profile can be incorporated in fasteners which are small in size and the tooth form does not destroy itself when fully tightened in the final stages of tightening the access panel to the understructure. Prior devices utilizing a tooth profile stamped from a sheet metal were found to be unsatisfactory because the fastener had to be large because of the inherent difficulty of stamping out the tooth profile and it was also found that the tooth form was destroyed when the access panel was fully tightened onto the understructure. On the other hand, in the present invention, it is possible for the fastener to have all of the advantages of the unsymmetrical tooth profile and at the same time permit the fastener to be miniaturized to meet the demands of present-day requirements for missiles and aircraft.

In another embodiment of this invention, a plurality of springs are used in the receptacle assembly to bias the aforesaid ratcheting device. This plural spring arrangement permits the selection of lower stress in each of the springs for any given preload or spring bias requirement which, in turn, increases the tolerance of the fastener to higher temperature since the effect of temperature on the springs is less than when the stress on the springs themselves is less. For example, known fasteners have heretofore been limited to approximately 700° F. With the plural spring arrangement the fastener can now be subjected to temperatures in excess of 1000° F. without detrimental effect. The plural spring arrangement in this latter embodiment has an additional advantage where very high vibrational accelerations and amplitudes are experienced. Where single springs are used there is always a danger that the vibrational effect on the spring will cause the spring to resonate therewith, thus seriously detracting from the latching ability of the ratcheting device by causing unintentional retrograde movement of the fastener and loosening of the panel. By the selection of springs which differ in their natural frequencies, it is possible to prevent the springs from resonating and thus eliminating reverse retrograde movement and increasing the security of the fastener.

Other features and advantages of the present invention will become apparent to anyone skilled in the art after a study of the specification and drawings forming a part hereof, and wherein:

FIGURE 1 is an exploded view of the fastener constructed in accordance with the teachings of this invention;

FIGURE 2 is an end view of the fastener as seen from the top of the panel;

FIGURE 3 is an end view of the stud nut as seen from the bottom of the understructure;

FIGURE 4 is an elevational view of the fastener in assembled relationship taken along line 4—4 of FIGURE 2 and looking in the direction of the arrows;

FIGURE 5 is an exploded view of the plural spring arrangement in the receptacle assembly;

FIGURE 6 is an enlarged view of the tooth profile of the ratchet in the receptacle assembly;

FIGURE 7 is an elevational view of the stud nut showing the rigid retaining means holding the stud nut on the panel; and FIGURE 8 is an enlarged perspective view of the shoulder on the stud nut which cooperates with the rigid retaining means for retaining the stud nut on the access panel.

In FIGURES 1 and 4, the stud nut 10 can be seen to comprise a fastening sleeve 11 which is insertable through an opening 12 in an access panel 13 and held affixed to the access panel by a rigid retainer ring 14.

The receptacle assembly, indicated in its entirely as 15, can be seen to comprise a screw 16 having a spring 17 and a ratcheting device comprising a pair of rings 18 and 20, all of which are assembled in a barrel receptacle or case 21. The barrel or case 21 is retained on the underside of the understructure 22 by a cage 23 by suitable rivets 24 in alignment with a hole 25 formed in the understructure 22.

Turning now to the stud nut assembly 10, as shown in FIGURES 1, 4 and 7, it can be seen that the fastening sleeve 11 is provided with a head 26 of a larger diameter than the depending shank 27 and is provided with a hex socket 28 to receive a wrench to apply torque thereto. The head 26 in this embodiment joins the shank 27 by a tapered portion 30 to be receive in a complementary counter sink in the access panel 13 to flush mount the fastening sleeve 11. It should be noted that the frusto conical head 26 as disclosed herein is for purposes of illustration only and that any type head may be used which may be actuated by a common screwdriver, wrench or by hand.

The shank 27 is internally threaded as at 31 (FIGURE 4) and is provided with a first enlarged portion 32 immediately beneath the tapered portion 30 and a second portion 32 of lesser diameter adjacent the chamfered end 34 of the shank opposite the head 26. The large diameter portion 32 and the smaller diameter portion 33 are separated by a frusto conical shoulder 35. The shank 27 is also provided with a plurality of axial grooves 36 (four being shown) which terminate a slight distance back from the chamfered end 34 of the shank to provide a sharp angular shoulder 37 in each groove 36 which acts as a stop for the further movement of the rigid retaining ring 14. The rigid retaining ring 14 is provided with complementary radially inwardly directed lugs 38 which extend into the slots 36 and serve to retain the rigid retaining ring 14 on the stud nut so that when the access panel 13 is free of the understructure, the stud nut will be retained on the access panel and the same may be used as a handle to carry the access panel about, as hereinabove mentioned.

As more clearly shown in FIGURE 7, the rigid retaining ring is assembled on the access panel 13 and differs from known retaining rings in that it is relatively rigid and serves the purpose of more permanently holding the stud nut in the panel. The type of material and strength thereof is to be selected by the use made of the stud nut, but it should be noted that the lugs 38 will differ from the spring-like material of known retaining devices in that they must be bent beyond the modulous of elasticity of the material so as to permit the stud nut to pass through aperture 40 in the retaining ring and thereafter must be bent again back to their original shape such as shown in FIGURE 1 so as to move axially and freely within the grooves 36.

As clearly seen in FIGURES 7 and 8, the axial grooves extend from adjacent the head 26 of the stud nut to immediately adjacent the chamfered end 34. This length of the grooves allows the full retraction of the stud nut so that the stud nut may be utilized as a handle and grasped more easily by workmen in moving the access panel. This full retraction also minimizes the amount of the stud nut extending on the underside of the access panel and thus minimizes the danger of damage to the stud nut if the access panel is laid on a surface or on another access panel and slid on this surface or panel so as to engage the chamfered end of the stud nuts as is often the case in the handling of access panels by workmen. It is to be noted further, and as more clearly shown in FIGURE 8, that the shoulder 37 is made sharp by a coining operation and at any angle of a least 90° F. or normal to the circumferential surface of the stud nut to provide maximum resistance to the lugs 38 of the rigid retaining ring 14 when said lugs act to retain the retaining ring on the stud nut. It should be clear that if this shoulder sloped toward the grooves, that is, sloped toward the head 26 of the stud nut, it would act as an inclined plane and thus have a tendency to allow the lugs to ride up this inclined plane under the force imposed thereon by the workmen using the stud nut as a handle and free the stud nut from the access panel.

With the description of the stud nut assembly thus far, it can be seen that the internal threads 31 of the fastening sleeve are to be threadably inserted over the screw 16 to fasten the access panels thereto, as will be explained in more detail hereinafter. Inasmuch as the hole pattern in the understructure 22 and in the access panel 13 may be misaligned, the shoulder 33 on the fastening sleeve, as it passes through both of the openings 12 and 25, serves to align them.

The understructure 22 is also recessed or counterbored as at 41 to accommodate the retaining ring 14 to permit the access panel 13 to be positioned flush with the understructure 22 as more clearly seen in FIGURE 4 and the end 34 of the shank 33 is provided with a transverse locking slot 42, the function of which will be more fully explained hereinafter.

Turning now to the receptacle assembly 15, the screw thereof comprises an enlarged head 50 having a depending externally, preferably multiple, threaded screw shank 51 which is tapered or provided with a pilot point near the end opposite the head, as illustrated at 52, for easy insertion of the stud nut 27 thereover as the quick action fastener is being assembled. The underside of the head has upwardly extending tabs 53 which mate with internal axial grooves in the barrel or receptacle 54. The helical spring 17 is telescoped over the shank 51 so that the lower end 55 reacts against the screw head 50 when in assembled relation such as illustrated in FIGURE 4.

The ratchet ring 18 also loosely telescopes over the screw shank 51 and is urged axially in a direction opposite the head 50 by reacting against the spring end 56. The ring 18 is provided with a pair of oppositely extending radial lugs 57 which extend into the axial grooves 54 in the barrel 21 so that the ring 18 is free floating over the screw shank 51 and is permitted axial movement relative to the head 50 but is prevented from rotational movement by operation of the lugs 57 and grooves 54. The ratcheting teeth of ring 18, indicated in their entirety as 58, face in a direction toward the access panel 13 and interengage with complementary ratcheting teeth 59 on the ring 20 which is also under the influence of the spring 17 when in assembled relation. However, this ring 20 is provided with axially extending locking lugs 60 which cooperate with the transverse locking slot 42 in the stud nut so that when the stud nut is threaded over the shank 51, the groove 42 locks into the lugs 60 by action of spring 17 and continued torquing of the stud nut serves to turn the ratcheting ring 20 therewith.

The screw head 50 serves as the bottom of the receptacle assembly with the lower end of the side wall 62 of the barrel 21 rolled or turned under as illustrated in FIGURE 4 at 63 so as to hold the head 50 against the shoulder 64 formed on the inner periphery of the barrel 21. The aforementioned upwardly extending tabs 53 are disposed so as to enter the grooves 54 at this time so as to prevent rotational movement of the screw with respect to the barrel. After insertion of the spring 17 and the rings 18 and 20, the cage 23 is placed over the large top plate 65 affixed to the top end of the tubular wall of the barrel 21 and the downwardly extending cage tabs 66 (four shown) are each bent back around the periphery of the top plate 65 (see FIGURE 3) so as to hold the entire receptacle assembly in assembled relationship. This receptacle assembly 15 is then attached to the underside of the understructure or panel 22 by any suitable means such as the aforementioned rivets 24, as more clearly illustrated in FIGURE 4.

With the receptacle assembly 15 so positioned beneath the understructure 22, the use of the quick action fastener is best shown in FIGURES 1 and 4. The holes 12 and 25 in the access panel 13 and understructure 22, respectively, are brought into substantial alignment and the stud nut 11 is then aligned with the hole 25 in the understructure 22 and its receptacle assembly 15. The stud nut 11 is inserted through the hole 25 and is threaded or torqued over several threads in the shank 51 of the screw 16, the outer end of the screw being pilot point or tapered as at 52 previously mentioned for that purpose. After a short or partial turn so as to thread the stud nut on the screw, the lugs 60 of the ratchet ring 20 engage the transverse locking slot 42 in the stud nut and the ratchet ring 20 continues to turn by continued torquing of the stud nut. The locking of the lugs 60 into the slot 42, together with the threads, serve to lock the stud nut in the receptacle assembly. Continued torquing-in of the stud nut causes the teeth 58 in the rotatable ring 20 to ride over the teeth 57 in the relatively fixed ring 18 against the bias of the spring 17. The holes 12 and 25 in the access panel 13 and the understructure 22, though they may be slightly misaligned, are brought into alignment by the operation of the tapered shoulder 35, as aforesaid, and the continued rotational movement brings the access panel into flush or contacting relationship with the understructure such as shown in FIGURE 4. While unauthorized reverse retrograde motion of the stud nut is prevented by the operation of ratchet rings 18 and 20 and spring 17, intentional reverse retrograde rotary motion of the fastening sleeve requires that the torque be applied in reverse direction so that the teeth 58 ride over the teeth 57 in the non-rotational, but axially movable, ratcheting ring 20 to remove the access panels.

As hereinabove mentioned, one of the important features of this invention is the fact that the torque required to tighten the fastening sleeve 11 over the screw 16 is markedly lower than the torque required to torque-out the fastening sleeve. In the embodiment disclosed, this is accomplished by providing the teeth 57 and 58 with a profile such that one surface of each tooth forms an inclined plane disposed at an angle with the horizontal or plane of relative rotation of the rings 18 and 20 less than the angle formed between the inclined plane formed by a second surface on the tooth and the plane of rotation of the ring. This is more clearly shown in FIGURE 6 where one tooth profile of the teeth 58 of the rotatable ring 20 is shown with its surface 70 at 40° to the plane of rotation of the ring and its other surface 71 at 50° to the same plane of rotation with a 90° angle 72 therebetween. Surfaces 70 and 71, of course, engage similarly angled but complementary surfaces on the ring 18. With such surfaces forming inclined planes of lesser angle when the stud nut is threaded in and inclined planes of greater angle when the stud nut is threaded out, the torque required to make the teeth ratchet, i.e., jump from one to the next, against the spring 17 is less in one direction than the other. This arrangement provides greater ease of insertion of the stud nut into the receptacle assembly for any given preload on selected stress of the spring 17 but, on the other hand, provides increased security for the fastener to remain in its fastened position.

Another advantage in this arrangement, as mentioned hereinabove, is that a lighter spring may be used because the torque rate required to thread out the stud nut is greater, which advantage is very important, particularly in small fasteners where the space in the receptacle assembly is quite small. Additional advantages in this arrangement are that the reliability and life of the spring are increased because of the lower working stress on the spring and inasmuch as high temperatures have less effect on springs of lower stress value and the temperature to which the fastener may be subjected is accordingly raised. A still further advantage in this arrangement occurs in the final stages of tightening the access panel to the understructure. Inasmuch as the torque required to fasten the sleeve fastener over the screw is divided into two components with the less torque required to thread in the fastener, more torque of the total torque applied is available to apply to the compressive load between the access panel and the understructure as they are being drawn tight toward one another.

It should be understood that while the surfaces 70 and 71 are shown and described as forming angles of 40° and 50°, respectively, these angles are approximate and that any range of degrees may be selected to vary the torque-in and torque-out value for any given selected spring stress rate to fit the particular requirements of the fastening device. However, in the practical embodiment of this invention, it has been found that the angle of 90° indicated at 72 in FIGURE 6 has been found to be preferable inasmuch as it permits the securing and removal of the access panel a greater number of times by reason of the fact that less wear has been found on the unsymmetrical teeth when this angle of 90° is used.

Turning now to FIGURE 5, it can be seen that there is therein disclosed a spring bias arrangement, indicated in its entirety as 17a, which performs the function of the spring 17 in the previously described figures, except that this spring bias arrangement comprises a plurality of springs (two shown), one of which is telescoped within the other and adapted to be telescoped over the shank 51 of the stud nut and reacts against the head 50, and the ratcheting rings 18 and 20 in a manner previously described in connection with spring 17. This plural spring arrangement, however, has the advantage of giving the same torque-in and torque-out value to the ratcheting device with lower stress in each of the springs which, of course, permits successful operation of the quick acting fastener at still higher working temperatures. As hereinabove mentioned, the less the spring stress, the less the temperature effect so that with the plurality of springs, the working stress in each spring can be lowered so that fasteners can meet the high temperature demands now required of such fasteners. For example, heretofore the upper limit of temperature of such fasteners has been 700° F., but now with the invention as shown in FIGURE 5, fasteners can be subjected to temperatures in excess of 1000° F. yet retain adequate spring rate and fastening effect.

There is still another advantage in the use of a plural spring arrangement such as shown in FIGURE 5. Inasmuch as installed fasteners are subject to very high vibrational accelerations and amplitudes, each spring can be selected to have a different natural frequency so as to become nonresonating and thus avoid resonant bouncing which otherwise might occur in the case of a single spring which bouncing would cause unintentional retrograde movement of the ratcheting device and consequently loosening of the access panel from the understructure.

While a plural spring arrangement has been described in connection with a ratcheting device having an unsymmetrical tooth profile such as shown in FIGURE 6, it is clear that the plural spring arrangement will work with a symmetrical tooth arrangement and the advantages of the plural spring arrangement will likewise accrue to such a fastener device. By symmetrical tooth arrangement is meant the type of ratcheting device where the tooth profile is such that the inclined planes or surfaces are equiangular with the plane of relative rotation of the rings.

While only a limited number of embodiments of the present invention have been disclosed and described herein, it will be readily apparent to persons skilled in the art that numerous changes and modifications may be made without departing from the scope of the invention. Accordingly, the foregoing disclosure and description thereof are for illustrative purposes only and do not in any way limit the invention which is defined only by the claims which follow.

What is claimed is:
1. A panel fastener for securing together a pair of apertured panels in facewise abutment, said fastener comprising:
   a stud nut assembly, said assembly including a headed cylindrical sleeve element for insertion through an aperture in the first panel, and
   means to prevent complete withdrawal of said sleeve element through said aperture after insertion therein;
   the head of said sleeve element having means for engagement with driving means;
   said sleeve element further having a shank with a threaded bore, said bore extending axially from a point in proximity to the head, to the end of the shank remote from the head;
   said sleeve element further having interlocking means disposed at the end of its shank remote from its head; and
   a receptacle assembly, said receptacle assembly including
   a headed screw, said screw having threading for mating engagement with the threading in the said bore of the shank of said sleeve element;
   an open-ended receptacle, said receptacle having such internal configuration as to enable it to house said screw and to rotatably receive said cylindrical sleeve element;
   means to secure said receptacle in register and in coaxial alignment with an aperture in the second panel;
   said receptacle being provided with means to hold said screw against rotation relative to said receptacle and in a position with its head remote from the aperture in said second panel and its shank extending coaxially with said receptacle toward said aperture;
   at least one helical spring disposed in said receptacle about said screw shank and extending from the screw head toward the opposite end of the screw;
   a first annular ratcheting element, the last said element being disposed coaxially in said receptacle and circumscribing said screw, and further being axially movable in said receptacle and relative to the screw shank, the last said element further having one transverse face thereof in abutment against an end of said spring and urged axially by the latter, and having a plurality of teeth disposed on its opposite transverse face, the last said element further being secured against rotation relative to said receptacle; and
   a second annular ratcheting element, said second element being disposed in said receptacle in coaxial abutment with said first annular element and movable axially relative to the shank of said screw, and said second element also having teeth on one face in mating engagement with the teeth on said first annular element, and said second element further having means for releasably engaging the interlocking means on the end of said sleeve element of the stud nut assembly, whereby said second element and said sleeve element are coupled together to prevent rotation of said second annular element relative to said sleeve element.

2. A panel fastener as described in claim 1 wherein a greater angle to a plane normal to the axis of the screw is provided for the wall of each of the teeth on the first and second ratcheting elements to which wall force is applied upon unthreading of the fastener, than the angle for the wall of each tooth to which latter force is applied upon threading of the fastener, the first-mentioned angle being so limited, however, as to permit each mating tooth of said abutting faces to slide up over each other upon the application of a sufficient quantum of torquing force applied to unthread the fastener.

3. A panel fastener as described in claim 1 wherein a pair of helical springs are disposed in said receptacle about said screw shank in telescoping arrangement, each of said springs having a different natural resonant frequency, thereby preventing complete loss of spring action through vibration of the fastener at either of the natural frequencies of said two springs.

4. In a threaded fastener having a first annular surface, said surface being substantially transverse to the fastener axis and spring-biased to abut a second annular surface, the latter surface also being substantially transverse to the fastener axis and both of said surfaces being provided with a series of axially directed mating teeth radiating from the said axis and engageable with each other to provide a ratcheting action upon the threading and unthreading of said fastener, said teeth being triangular in cross-section, the improvement which comprises each tooth having a first external wall to which force is applied upon unthreading of the fastener and having a second external wall to which force is applied upon threading the fastener, the intersection of said walls defining the apex of the tooth, wherein the first-mentioned wall forms a lesser interior angle relative to a plane which includes both the fastener axis and the apex of the tooth than does the latter wall, which includes the apex of a particular tooth, the first-mentioned angle being so limited, however, as to permit each mating tooth of said abutting surfaces to slide up over each other upon the application of a sufficient quantum of torquing force applied to unthread the fastener.

References Cited by the Examiner

UNITED STATES PATENTS

| | | | |
|---|---|---|---|
| 2,006,359 | 7/1935 | Lackner | 151—39 |
| 2,839,808 | 6/1958 | Zahodiakin | 151—69 |
| 2,850,781 | 9/1958 | Pachmayr | 151—69 |
| 2,984,884 | 5/1961 | Chapman et al. | 85—5 |
| 3,141,487 | 7/1964 | Boyd | 151—69 |
| 3,176,814 | 4/1965 | Sink | 151—6 |
| 3,192,980 | 7/1965 | Sauter | 151—69 |

FOREIGN PATENTS 940,791  3/1956  Germany.

CARL W. TOMLIN, *Primary Examiner.*

R. S. BRITTS, *Assistant Examiner.*